Patented Feb. 27, 1951

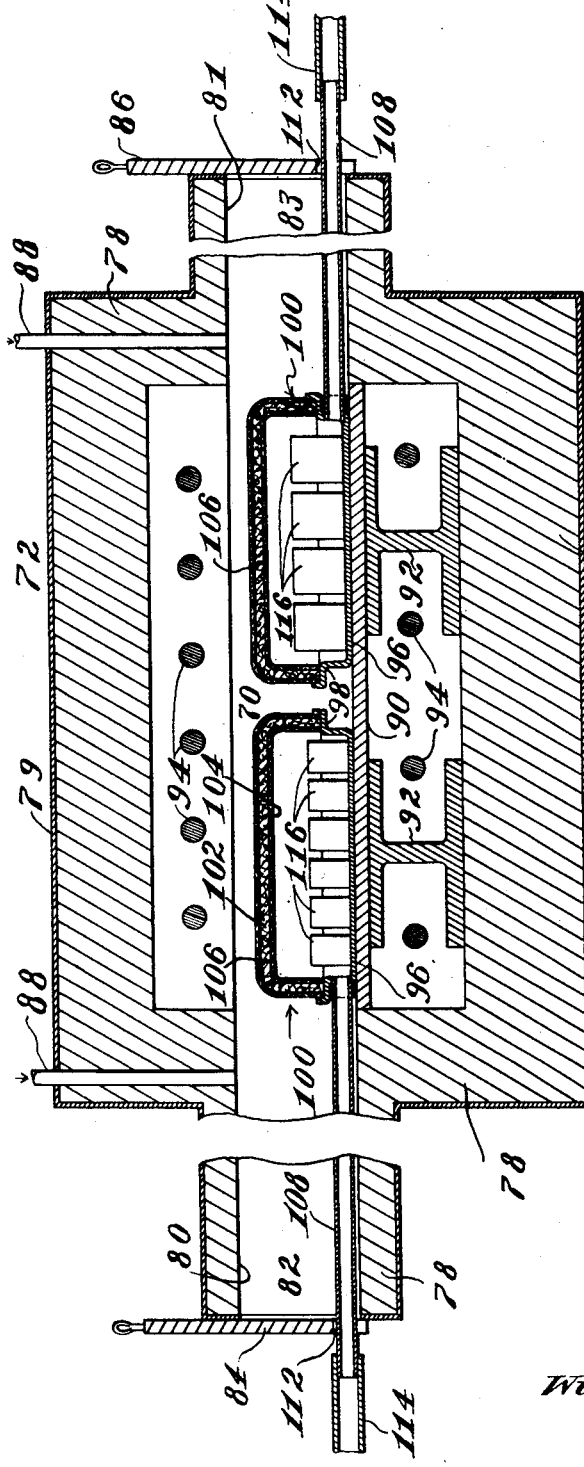
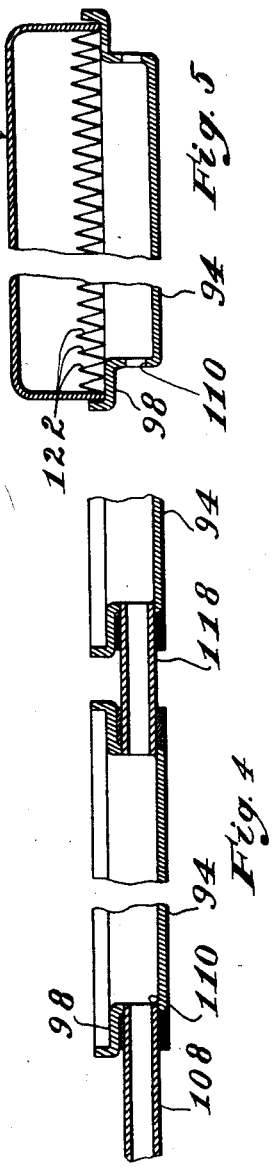

2,543,708

UNITED STATES PATENT OFFICE 2,543,708

HEAT-TREATING FURNACE

Richard E. Rice, Arlington, Mass., and William P. Matthew, Washington, R. I., assignors to Comstock & Wescott, Inc., Cambridge, Mass., a corporation of Massachusetts Application May 29, 1947, Serial No. 751,404

1 Claim. (Cl. 266—5)

This invention relates to an apparatus for heat-treating metallic objects composed of ferrous metals and their alloys to obtain an end product of a given carbon content.

In the making of objects of steel and the alloys thereof by the methods of powder metallurgy, it is desirable to heat-treat at a relatively high temperature porous compacts of steel containing predetermined and carefully controlled amounts of carbon in a heat-treating atmosphere whose carbonizing potential has been carefully balanced so that the carbon content of the porous steel compact being heat-treated will be either unchanged or changed by certain predetermined amounts.

In order to attain the necessary equilibrium conditions, it has been proposed to employ a furnace which is provided with a gas-tight metallic muffle designed to extend through the hot heat-treating zone of the furnace, and also through the preheating and cooling zones. Gastight muffles of the aforesaid character are, however, costly, and in a heat-treating atmosphere containing carbon at high temperature they deteriorate rapidly due to the absorption of carbon which makes them brittle. As a result, the muffles develop cracks through which gases from the outside may enter, thus rendering them ineffective and resulting in an upset of the equilibrium conditions. Hence, the use of muffles is not practical.

To overcome the disadvantages of the muffle-type of furnace it has been proposed to provide a gas-tight metallic outer shell within which there is disposed a lining composed of insulating ceramic refractories. In such a furnace the carefully balanced heat-treating atmosphere is in contact with the highly porous refractory lining in the heating chamber. If this heat-treating atmosphere is comprised of hydrogen and gaseous hydrocarbons, it may react with certain of the constituents of the ceramic lining at the high temperature employed for sintering the steel compacts to produce small quantities of water vapor which will then mix with and hence contaminate the heat-treating atmosphere in the furnace. Furthermore, during shutdown periods when the furnace is open, the ceramic lining will take up oxygen by absorption or occlusion, and this on subsequent heating will be emitted from the ceramic lining, mix with the heat-treating atmosphere and react therewith to form water vapor. As a result, a heat-treating atmosphere which may be introduced to the furnace in a very dry condition may pick up a considerable amount of moisture during the course of the heat-treating operation. Although at the sintering temperature employed the water vapor reacts with the hydrocarbon in the heat-treating atmosphere to form harmless carbon monoxide and hydrogen, this reaction is so slow that appreciable amounts of unreacted water vapor are likely to come in contact with the compacts before it is rendered harmless by the aforesaid reaction. This free or unreacted water vapor reacts much more rapidly with the carbon in the compacts to remove the carbon therefrom than with the hydrocarbon in the heat-treating atmosphere. Hence, if the heat-treating atmosphere containing unreacted water vapor is allowed to flow over the compacts being heat-treated, they will become progressively leaner in carbon content, and after heat-treating they will not only have a different carbon content from that which they had initially but the carbon content may vary from compact to compact and also within individual compacts.

It is an object of this invention to provide heat-treating apparatus in which a carefully balanced heat-treating atmosphere may be maintained without contamination, in which such harmful gases as may be present may be neutralized, and in which steel parts, particularly porous steel compacts, may be treated without harmful reaction with the heat-treating atmosphere.

Accordingly a pervious metal shield or muffle made up of at least one of a group of metals having a melting point about 2000° F. is placed within the heat treating furnace so as to be situated between the ceramic lining thereof and the material being treated in the furnace through which all the heat-treating gases which contain harmful amounts of water vapor which would tend to upset the equilibrium condition of the heat-treating gases surrounding the pieces being treated must pass before contacting the pieces. The preferred metals are Co, Fe, Nn, Mo, Ni, Pd, Pt, Ta, Ti, W, V, Zr, alloys of two or more of these metals, and alloys of nickel-chromium and nickel-chromium-iron. As illustrated, the catalytic shield, in one form of the invention, is substantially coextensive with the ceramic lining of the furnace and the heat-treating gases are introduced through the ceramic lining and through the catalyst into the interior of the furnace so that any contaminating gases originating outside of the catalytic shield must necessarily pass through the catalytic shield to gain entrance to the heat-treating chamber and hence be rapidly converted as it passes through the hot catalyst into harmless gases before it passes into the chamber. As illustrated herein, the heat-treating gases may include hydrogen and gaseous hydrocarbons, and since a part of the hydrocarbon components of the mixed gases introduced into the furnace is used up in the foregoing reaction with the water vapor, the amount of the gaseous hydrocarbon originally introduced must be sufficient so that after the reaction there is enough hydrocarbon remaining to assure an equilibrium condition within the furnace to produce an end product of the desired carbon content.

In another form of the invention the harmful gases, such as water vapor originating in the hot walls of the ceramic lining, are kept out of contact with the pieces being heat-treated by placing them in receptacles which may be introduced into the furnace, covering the receptacle with a shield made of the aforementioned catalytic material, and introducing the heat-treating gases into the receptacle within the confines of the shield. As thus constructed, any contaminating gases originating outside the shield must first pass through the shield before contacting the pieces, and in passing through will be rapidly converted in the presence of the catalyst to harmless gases.

The invention will now be described with reference to the accompanying drawings in which Fig. 1 is a longitudinal section through a heat-treating furnace showing a gas-tight envelope housing the outer walls and a catalytic liner coextensive with the inner walls;

Fig. 3 is a longitudinal section of a modified furnace showing a combined tray and a catalytic shield for objects being heat-treated;

Fig. 4 is a detail of article-receiving trays arranged in tandem for use in the furnace shown in Fig. 3; and Fig. 5 shows a modified form of shield.

Figures 1, 2:
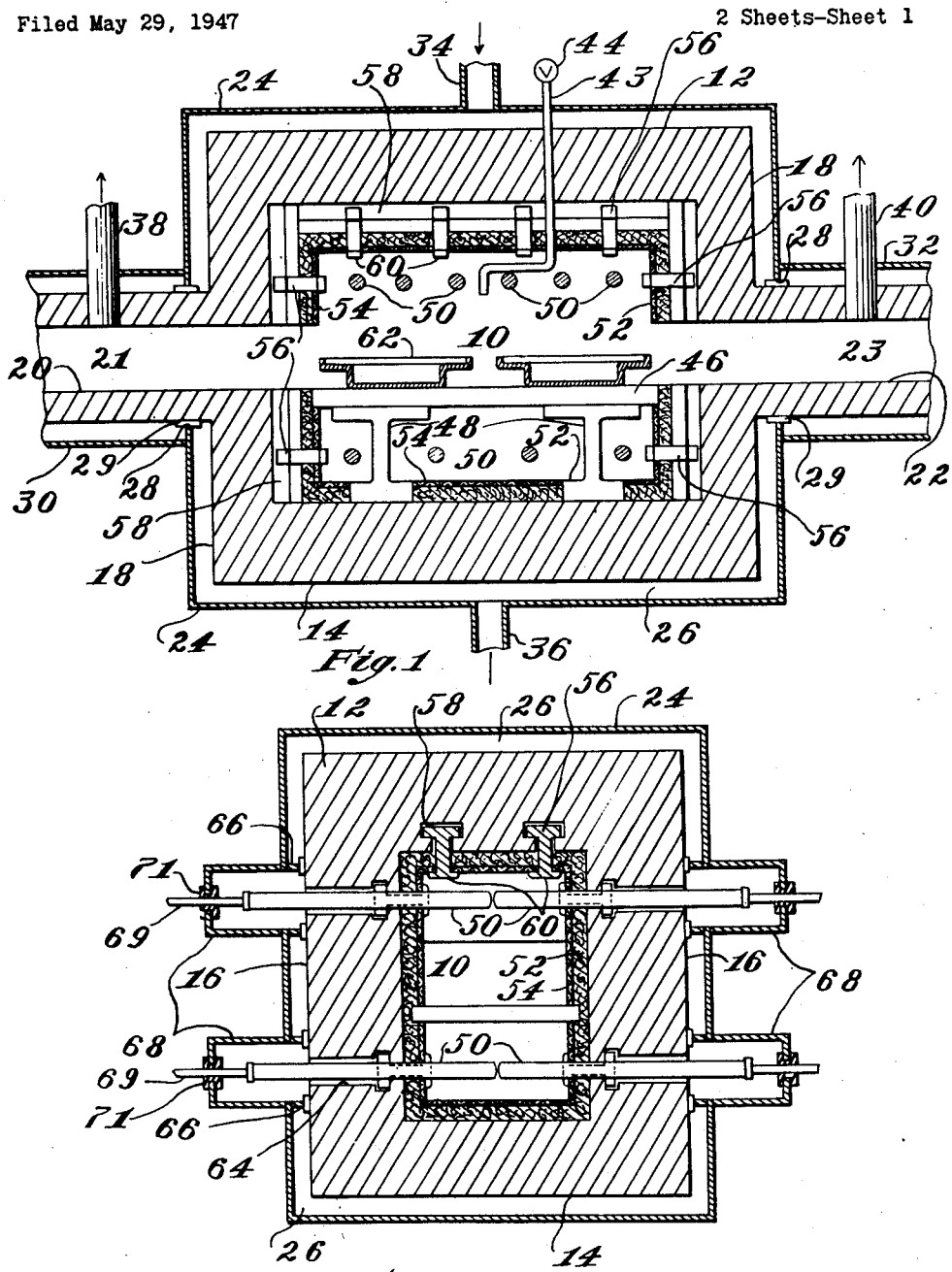
Fig. 2 is a transverse section on the line 2—2 of Fig. 1.

As illustrated in Figs. 1 and 2, the furnace comprises a chamber 10 substantially rectangular in cross-section defined by top, bottom, side and end walls 12, 14, 16 and 18, respectively, composed of porous ceramic refractory material. The chamber 10 constitutes the high temperature or heat-treating zone of the furnace. Extending laterally from opposite ends of the furnace there are preheating and cooling zones 21 and 23 in the form of elongate-walled passages 20 and 22, formed of ceramic material, opening out of the chamber 10, the free ends of these passages being closed by suitable doors not shown herein. Surrounding the entire furnace and spaced therefrom is a gas-tight sheet metal envelope 24 between which and the outer surface of the walls of the furnace there is a space 26. The end walls of the envelope 24 have openings 28 therein through which project the laterally extending walled passages 20 and 22. A seal is provided between the openings 28 and these walled passages by suitable packing glands 29 interposed between the inner peripheral edges of the openings and the outside surfaces of the walled passages. The walled passages 20 and 22 are enclosed in gas-tight, tubular sheet steel housings 30 and 32 surrounding them and welded at one end to the envelope bordering the openings 28. Inlets 34 and 36 are provided in the envelope 24 to permit introduction of the mixed heat-treating gases to the space 26 under slight pressure so that it filters through the ceramic material of the walls into the furnace chamber. Outlets 38 and 40 are formed in the lateral walled passages 20 and 22, the outlets extending from the inside of these passages out through the tubular members 30 and 32 to permit escape of the used gases. A gas sampling tube 43 is also provided which passes through the envelope and the top wall of the chamber 10 terminating inside of the chamber at approximately the midpoint between its opposite ends and centrally thereof. A valve 44 is placed at its exposed end to prevent ingress of contaminating gases and to permit drawing off samples of gases from the furnace chamber when desired. Within the chamber 10 there is a horizontally disposed plate 46 constituting the hearth of the furnace which forms a support for the articles being heat-treated. The hearth or plate may consist of silicon carbide and is supported in position from the bottom wall 14 of the furnace by pedestals 48. Heating elements 50 are positioned above and below the hearth 46 adjacent to the top and bottom walls of the chamber for heating the same. Preferably they are conventional silicon carbide rods known as "Globars."

In accordance with one form of the invention there are disposed in coextensive relationship with the inside ceramic walls of the chamber 10 catalytic shields consisting of loose, porous batts 52 held against the walls by screens 54 composed of the same material but which are continuous and somewhat more rigid in character. The screens are held against the walls by supports 56 in the form of T-shaped pins slidably received in slots 58 formed in the walls of the furnace, the pins having on their lower ends buttons 60 for engagement with the exposed sides of the screens to retain them in place.

It is desirable to permit free expansion and contraction of the Carborundum heating elements 50 and hence, as constructed herein, apertures 64 (Fig. 2) are formed in the side walls 16 of the furnace loosely to receive the heating elements. In order to prevent too large a flow of the mixed gases introduced to the space 26 through these apertures into the furnace, the outer ends of the aperture 64 are sealed by annular flanges 66 formed integral with the casing 24 and extending inwardly therefrom into contact with the walls of the chamber. The outer ends of the heating elements are housed by cylindrical walls 68 which form outward extensions of the flanges 66 and have closed ends. Electric conductors 69 are connected to the electrodes and pass through the end walls of the housing 68 by way of packing glands 71.

As thus constructed, the steel compacts or objects to be treated are placed in a tray 62 (Fig. 1) and introduced through the preheating zone 21 to the heat-treating chamber 10, and after treatment has been concluded are discharged through the cooling zone 23. During treatment of the articles a mixture of hydrogen and/or gaseous hydrocarbons in the desired proportions is prepared outside of the furnace and is introduced through the inlets 34 and 36 to the space 26 between the envelope 24 and the outside of the furnace chamber 10 under a pressure which is slightly in excess of the pressure within the chamber 10 so that there is an infiltration or diffusion of the mixed gases through the interstices of the walls into the chamber 10. As the mixture of gases passes through the porous refractory material of the walls it will entrain any small amount of free oxygen that may have been absorbed therein or occluded thereby combining with it to form water vapor and carry it inwardly through the catalytic material secured to the inner walls of the chamber. Moreover any water vapor formed by reaction between the hot ceramic and the reducing constituents of the heat-treating atmosphere will also be carried inwardly through the catalytic metal. At this point, that is at the surface of the catalyst and at the temperature within the chamber, the catalyst brings about a rapid reaction between the mixed gases and the water vapor and/or oxygen to form gaseous products which are inert or at least innocuous, that is, carbon monoxide and hydrogen which in the absence of water vapor do not change the carbon content of the metal. Since the infiltration of the mixed gases is from all sides of the furnace at once, there is little chance for the formation of pockets of stagnated gases. Thus the heat-treating atmosphere which enters the furnace is free from moisture and/or oxygen, and hence there is little or no opportunity for water vapor and/or oxygen coming in contact with the articles being treated.

As heretofore pointed out, there must be a sufficient quantity of hydrocarbon in the mixed gases introduced not only to react with the water vapor and oxygen in the walls of the furnace but also to provide a heat-treating atmosphere which is in equilibrium with the carbon content of the article being treated to prevent an undesirable change in the carbon content thereof. In order to determine the exact composition of the gases within the chamber 10, samples may frequently be taken through the tube 43 and analyzed. The composition of the gases being prepared for introduction may then be varied in accordance with the findings from the samples taken to correct the character of the heat-treating gases introduced.

Since the pressure of the gases introduced into the space 26 is slightly greater than that in the furnace chamber 10, there will be a continuous, slow circulation of the mixed gases into the furnace and outwardly through the lateral passages 20 and 22 and from thence to the outlets 38 and 40 to the atmosphere. The discharged gases may be discarded or may be purified and re-used.

The catalytic shields illustrated above are made up of batts of loose metallic material, such as metal wool, these batts being supported in place by means of wire screens. The physical character of the catalyst, of which the shield is composed, may be varied within wide limits. Instead of batts of metal wool, metal chips or filings may be used, for example, such chips or filings might be interposed between a pair of screens having side and end walls to retain the loose material and as thus made up be fastened against the walls of the furnace. Since many of the refractory metals may be secured in a less expensive form as a powder, it may be desirable to make up a shield by confining powdered metal of the desired character between spaced metal screens of fine mesh.

The catalyst of which the shields are made may consist of any one of a number of metals which will promote rapid reaction between water vapor and/or oxygen with hydrogen and/or the hydrocarbon gases employed to maintain the proper heat-treating atmosphere within the furnace. It is preferred to use a metal or alloy which has a melting point exceeding 2000° F. and is not readily oxidized in the atmosphere used for the heat treating process. Suitable metals for this purpose were found to include the following: Co, Fe, Mn, Mo, Ni, Pd, Pt, Ta, Ti, W, V and Zr. Alloys consisting of two or more of these metals may also be employed, and alloys of nickel-chromium and nickel-chromium-iron being among the preferred catalytic materials. The furnace operates at a temperature above 2,000° F., hence metals having a melting point below 2,000° F. are impractical since they cannot be employed in a shape to be suitable for performing their catalytic functions.

It is to be noted that although nickel-chromium alloys and nickel-chromium-iron alloys are not suitable materials for making gas-tight muffles for use under these conditions of atmosphere and temperature, they are, nevertheless, suitable for use as gas permeable catalysts. In the case of a gas-tight muffle, even a small crack will allow contaminating gases to enter and thus destroy its usefulness. In a catalytic shield, however, not only is the disintegration much slower due to the fact that it is more flexible and therefore subjected to less severe thermal stresses and strains, but also because considerable disintegration can take place before it loses its effectiveness. Moreover, catalytic screens of this type may be replaced at much less expense.

Although the apparatus described above is a desirable one, many modifications are possible. Instead of passing the mixed gases through the walls of the furnace and through the catalytic shield attached to the walls, they may be conducted directly to the interior of the heating chamber from a duct not shown herein or through the charge or discharge openings of the furnace. In this case the mixed gases do not pass through the catalytic shields. However, the latter serve to prevent contamination of the gases introduced.

A somewhat modified form of furnace is illustrated in Fig. 3. This furnace comprises a chamber 70 of substantially rectangular cross-section defined by top, bottom, side and end walls 72, 74, 76 and 78, respectively, closely surrounded by a gas-tight metal envelope 79. The end walls 78 have lateral passages 80 and 81 extending through them from the chamber 70 which constitute preheating and cooling zones 82 and 83. The open ends of the passages 80 and 81 may be closed by slidable doors 84 and 86, respectively. In accordance with the usual practice, flame curtains are provided at these doors to prevent the entrance of any free oxygen or water vapor into the chamber 70 which might leak through from the doors 84 and 86. Outlet conduits 88 are provided in the top wall of the furnace adjacent to the entrances to the chamber 70 through which the used gases are exhausted. Within the chamber 70 there is a horizontally disposed flat plate or hearth 90, such as heretofore described, for supporting the articles to be treated, the hearth in turn being supported from the bottom wall of the furnace by pedestals 92. Above and below the hearth plate, adjacent to the top and bottom walls of the furnace, are heating elements 94 for supplying the necessary amount of heat for heat-treating the articles. The articles to be heat-treated are placed in trays 96 for introduction into and removal from the chamber 70 of the furnace through the preheating zone 82, these trays being formed of a heat-resistant material, preferably one of the metals which has catalytic properties of the kind necessary to promote rapid reaction between moisture and oxygen with the mixed gases introduced to the furnace. Each tray has at its rim a lateral, horizontally extending lip or ledge 98 adapted to receive and support a catalytic shield 100 which serves as a cover for the tray. The shield 100 may be composed of spaced metallic screens 102 and 104 composed of wire mesh of fairly heavy gauge between which there are disposed loose batts 106 of metallic wool. Both the screens and the fibrous batts of metallic wool are composed of one of the aforementioned catalytic metals. As illustrated in Fig. 4, a hollow tube 108 preferably made of the same material as the tray is attached at one end to one end of the tray, being welded into an aperture 110 formed therein and is of such length as to extend laterally therefrom through the preheating zone 82 to the outside of the furnace. A slot 112 is formed in one or both of the doors 84 and 86 through which the tube 108 passes. The outer end of the tube 108 is connected to a flexible hose 114 which may in turn be connected to a supply of premixed gases. When articles are to be given a heat-treatment, the tray is withdrawn from the furnace, the cover 100 is removed, and the articles 116 are disposed in the tray, whereupon the cover is replaced and the tray is pushed into the chamber 70 through the flame curtain using the tube 108 as a handle for this purpose. A dry mixture of the heat-treating gases in the proper proportions is then introduced through the tube 108 under slight pressure which purges the tray of any contaminating gases so that when the articles reach the sintering temperature the surrounding atmosphere is of such character as to be in equilibrium with the article of the desired carbon content. While, as heretofore described, there is a preheating zone 82 and a cooling zone 83, and while for production purposes the operation is continuous, the article being moved in at the preheating end and out at the cooling end, the articles may be moved in from both ends of the furnace, as is illustrated in Fig. 3. In some instances it may be desirable to join a number of trays into tandem, and, as shown in Fig. 4, this may be done by interconnecting the trays by means of tubes 118 so that the mixed gas introduced through the tube 108 will not only enter the first tray but will also pass through to the second tray, the third and etc. through a whole series, if such an arrangement is employed.

A draft hood with an exhaust fan may be provided at the outlet of the furnace so that the gaseous elements of the sintering atmosphere issuing from the furnace will not pass into the room but will be drawn off and exhausted to the outside atmosphere.

If desired, prior to introducing a tray with articles disposed therein into the heating chamber, it may be purged of combustible gases, that is, the oxygen in the air, and water vapor by feeding an inert gas, such as nitrogen, through the tube 108 into the tray so as to force these gases outwardly through the cover 100.

In one form of the invention instead of using a porous shield as heretofore described, a solid shield (Fig. 5) in the form of a cover 120 may be employed to permit escape of the gases. When using this construction the cover may be perforated or its lower edge may be serrated at 122 so as to provide openings between it and the ledge 98. In whatever form the cover takes it is desirable to secure the same in place to prevent it from being lifted from the trays by the pressure of the gases introduced to the trays. In most instances this pressure is relatively small so that the weight of the cover is sufficient to retain it in place. If, however, a high pressure is to be used, it may be necessary to provide some sort of latching or clamping means for locking the covers to the trays, any conventional means being suitable.

The heat-treating atmosphere to which gaseous hydrocarbon is added to create the desired heat-treatment atmosphere within the furnace may be produced in a variety of ways. Pure hydrogen may be employed or a mixture of hydrogen and nitrogen obtained by cracking ammonia. Alternately a mixture of hydrogen and/or carbon monoxide may be employed, such as a mixture being obtained by passing air and/or steam over a bed of carbon at high temperature. A partially or completely burned gaseous or liquid fuel is also suitable. If any of the aforesaid gases contain water vapor, it may be removed by passing the gas through desiccants, although it may be more convenient to add extra gaseous hydrocarbon to neutralize the water vapor.

Having prepared the heat-treating atmosphere, gaseous hydrocarbon is mixed with it in sufficient quantity to neutralize any harmful amounts of water vapor present, to neutralize any oxygen-bearing gases entering the heat-treating space from the ceramic refractories or elsewhere in the furnace, and to bring the atmosphere substantially into equilibrium with steel of the desired final carbon content at the heat-treating temperature. Rapid reaction between the hydrocarbon and water vapor is promoted by causing the mixture to pass through a catalyst before it comes into contact with the steel objects being heat-treated.

It should be understood that the present disclosure is for the purpose of illustration only and that this invention includes all modifications and equivalents which fall within the scope of the appended claim.

We claim:

In combination with a heat-treating furnace having a chamber defined by walls of heat-resistant ceramic material and in which an atmosphere of a predetermined character is maintained by introduction therein of a given mixture of gases, adjustable heating elements, said walls having through openings therein for adjustably receiving said heating elements without packing glands, an air-tight envelope encompassing said chamber and the outer ends of said heating elements forming a space between the envelope and the chamber into which is introduced said given mixture of gases at a pressure slightly in excess of the pressure within the chamber and a continuous wall surrounding each heating element where it projects from its opening, said wall extending between the wall of the envelope and the wall of the furnace bordering the aperture.

RICHARD E. RICE.
WILLIAM P. MATTHEW.

REFERENCES CITED

The following references are of record in the file of this patent:

UNITED STATES PATENTS

| Number | Name | Date |
|---|---|---|
| 164,080 | English | June 8, 1875 |
| 1,492,143 | Stevens | Apr. 29, 1924 |
| 1,673,271 | Stewart | June 12, 1928 |
| 1,709,658 | Colby | Apr. 16, 1929 |
| 1,712,253 | Chopra et al. | May 7, 1929 |
| 1,905,810 | Cowan et al. | Apr. 25, 1933 |
| 1,907,331 | Milliff | May 2, 1933 |
| 2,124,573 | Hayes | July 26, 1938 |
| 2,146,760 | Pearson | Feb. 14, 1939 |
| 2,246,322 | Roth | June 17, 1941 |
| 2,275,106 | Hayes | Mar. 3, 1942 |

FOREIGN PATENTS

| Number | Country | Date |
|---|---|---|
| 494,339 | Great Britain | Oct. 24, 1938 |
| 502,543 | Great Britain | Mar. 20, 1939 |
| 624,268 | Germany | Dec. 24, 1935 |